US012399994B2

(12) United States Patent
Kornegay et al.

(10) Patent No.: US 12,399,994 B2
(45) Date of Patent: Aug. 26, 2025

(54) ENSEMBLE INTRUSION DETECTION SYSTEM FOR IOT PLATFORMS

(71) Applicant: Morgan State University, Baltimore, MD (US)

(72) Inventors: Kevin Kornegay, Towson, MD (US); Otily Toutsop, Baltimore, MD (US)

(73) Assignee: Morgan State University, Baltimore, MD (US)

( * ) Notice: Subject to any disclaimer, the term of this patent is extended or adjusted under 35 U.S.C. 154(b) by 38 days.

(21) Appl. No.: 18/600,391

(22) Filed: Mar. 8, 2024

(65) Prior Publication Data

US 2025/0103714 A1    Mar. 27, 2025

Related U.S. Application Data

(60) Provisional application No. 63/450,764, filed on Mar. 8, 2023.

(51) Int. Cl.
*G06F 21/56*    (2013.01)

(52) U.S. Cl.
CPC .......... *G06F 21/565* (2013.01); *G06F 21/566* (2013.01)

(58) Field of Classification Search
CPC ....... G06F 21/56; G06F 21/565; G06F 21/566
See application file for complete search history.

(56) References Cited

U.S. PATENT DOCUMENTS

| | | | |
|---|---|---|---|
| 10,218,718 B2 | 2/2019 | Kopp et al. | |
| 10,230,749 B1 * | 3/2019 | Rostami-Hesarsorkh | G06F 21/56 |
| 10,454,955 B2 | 10/2019 | Schulman et al. | |
| 10,650,079 B2 | 5/2020 | Jindal et al. | |
| 11,032,302 B2 * | 6/2021 | Garcia | H04L 63/1408 |
| 11,075,934 B1 | 7/2021 | Aldhaheri et al. | |
| 11,206,279 B2 | 12/2021 | Dada | |
| 11,206,280 B2 | 12/2021 | Dada | |
| 11,443,230 B2 | 9/2022 | Cam-Winget et al. | |
| 12,225,046 B1 * | 2/2025 | Mushtaq | H04L 41/16 |
| 2021/0224388 A1 * | 7/2021 | Blemel | G06F 21/6245 |

(Continued)

FOREIGN PATENT DOCUMENTS

| | | | | |
|---|---|---|---|---|
| AU | 2020370589 A1 * | 4/2022 | | H04W 12/02 |
| CN | 112688933 A * | 4/2021 | | |

(Continued)

*Primary Examiner* — Jayesh M Jhaveri
(74) *Attorney, Agent, or Firm* — Whiteford, Taylor & Preston, LLP; Peter J. Davis

(57) ABSTRACT

An automated method and system for modeling intrusion detection on an Internet of Things network preprocess received raw data packets. The raw data packets are converted to a packet capture file, which is converted to a comma separated value (CSV) file. The CSV file is filtered to create normal and abnormal CSV files. An attack is identified in the abnormal CSV file. Features associated with the attack are labeled and classified as an attack type. The abnormal and normal CSV files are merged. Redundant data is removed from the merged file, which is added to a concatenated file with other merged files. Features are extracted from the concatenated file and a machine language (ML) model is built using the extracted features. ML classifiers are determined for each merged file for the ML model to build an ensemble ML model. A dynamic ensemble of ML classifiers detects evolving attack types.

16 Claims, 8 Drawing Sheets

(56) References Cited

U.S. PATENT DOCUMENTS

2022/0330027 A1* 10/2022 Djukic ................ H04L 47/2475
2022/0385674 A1* 12/2022 Donbosco ................ G06N 5/04

FOREIGN PATENT DOCUMENTS

| CN | 113904795 A | * | 1/2022 | ....... G06F 18/24323 |
| CN | 115225301 A | * | 10/2022 | ......... H04L 63/1425 |
| CN | 116248367 A | * | 6/2023 | ......... H04L 63/1425 |
| KR | 102032249 B1 | * | 10/2019 | ......... H04L 47/2441 |
| VN | 10042196 B | * | 12/2024 | |
| WO | WO-2018222937 A1 | * | 12/2018 | ............. G06V 20/58 |

* cited by examiner

Welford's Technique Sample Variance Calculation $$(M-1)s_M^2 - (M-2)s_{M-1}^2$$

$$= \sum_{i=1}^{M}(x_i - \bar{x}_M)^2 - \sum_{i=1}^{M-1}(x_i - \bar{x}_{M-1})^2$$

$$= (x_M - \bar{x}_M)^2 + \sum_{i=1}^{M-1}((x_i - \bar{x}_M)^2 - (x_i - \bar{x}_{M-1})^2)$$

$$= (x_M - \bar{x}_M)^2 + \sum_{i=1}^{M-1}(x_i - \bar{x}_M + x_i - \bar{x}_{M-1})(\bar{x}_{M-1} - \bar{x}_M)$$

$$= (x_M - \bar{x}_M)^2 + (\bar{x}_M - x_M)(\bar{x}_{M-1} - \bar{x}_M)$$

$$= (x_M - \bar{x}_M)(x_M - \bar{x}_M - \bar{x}_{M-1} + \bar{x}_M)$$

$$= (x_M - \bar{x}_M)(x_M - \bar{x}_{M-1})$$

where M is the data, x represents the mean of the data, s is the standard deviation, xi is a sample in the data.

FIG. 8

ENSEMBLE INTRUSION DETECTION SYSTEM FOR IOT PLATFORMS

CROSS-REFERENCE TO RELATED APPLICATIONS

This application is based upon and claims the benefit of U.S. Provisional Application No. 63/450,764 titled "Ensemble Intrusion Detection System for IoT Platforms," filed with the United States Patent & Trademark Office (USPTO) on Mar. 8, 2023, the specification of which is incorporated herein by reference in its entirety.

This application also incorporates by reference in its entirety related U.S. Non-Provisional application Ser. No. 18/419,037 titled "Detection and Survival Method Against Adversarial Attacks on Automated Systems," filed with the USPTO on Jan. 22, 2024.

FEDERALLY SPONSORED RESEARCH AND DEVELOPMENT

This application was developed using U.S. Government Funds under contract of the National Institute of Standards and Technology (NIST), contract no. 640000-02.

FIELD OF THE INVENTION

The invention relates to security for an Internet of Things (IoT) cloud platform and edge devices. More specifically, the invention relates to systems and methods for capturing, parsing, and transforming data for intrusion detection in an IoT environment.

RELATED ART

Among related art, U.S. Pat. No. 10,218,718 provides for rapid and targeted network threat detection that can be implemented in an IoT environment. U.S. Pat. No. 11,075,934 involves a method for hybrid networks in an IoT environment. U.S. Pat. No. 11,443,230 executes a machine learning model for an IoT open environment. U.S. Pat. No. 10,454,955 uses behavior models that are continuously updated by learning machine determinations. Among the related art that involve some use of preprocessors include U.S. Pat. Nos. 10,650,079, 11,206,280, and 11,206,279.

BACKGROUND OF THE INVENTION

As Internet of Things (IoT) devices become more commonplace in everyday life, security concerns are at the forefront. An IoT system can include a plethora of various devices interconnected by constrained devices, which play a critical role to enable connectivity and data collection even in challenging environments. A constrained device typically possesses limited processing and storage capabilities and is designed to provide maximum data output while operating with minimal power input for cost-effectiveness. These devices are often used in environments and scenarios where there is no external source of power, such as in remote locations or harsh conditions (e.g., agricultural monitoring, weather and environmental condition monitoring) independent from infrastructure. As such, constrained devices typically include limited-function microcontrollers, sensors, actuators, and other small computers that operate effectively in these limited environments.

Due to their limitations, constrained devices lack built-in security protection. For example, power and memory limitations may not support antivirus software such as Norton, McAfee, and Kaspersky. Further, IoT technology builders do not emphasize security during the design process, releasing products into the market that are prone to hacking. Lastly, constrained devices may not be able to handle automatic firmware updates or remote configuration. Therefore, IoT devices, including cameras, thermostats, smoke detectors, and fire alarms, that rely on such constrained devices for their connectivity and operation in an IoT ecosystem may function 24/7 without any human intervention or protection.

Even for IoT systems that are well within reach of 24/7 human monitoring and care, such as intelligent home systems, hackers can pose challenges. According to research by Nippon Telegraph and Telephone (NTT) Data Corporation, 80 percent of customers in the United States are concerned about the security of their smart home data. In the home, IoT technology has several advantages, and more people worldwide are becoming increasingly reliant on the technology and the gadgets that support it. Many IoT devices, on the other hand, are deployed without regard for security, increasing the number of attack avenues available to attackers. Attackers have gained access to IoT devices that lack security safeguards, resulting in a large number of security issues.

Attackers can access intelligent home devices and use them to take control of the house, such as shutting off the lights, manipulating alarm systems, and opening smart locks. Attackers have been able to gain access to the intelligent home network, resulting in data exfiltration. Smart homes must contend with various risks, including Man-in-the-Middle (MIM) attacks, data and identity theft, and Denial of Service (DOS) assaults. Hardware vulnerabilities related to common communication protocols such as Serial Peripheral Interface (SPI), Inter-Integrates Circuit (I2C), and Universal Asynchronous Reception and Transmission (UART), testing standards such as Joint Test Action Group (JTAG) standards for debugging embedded systems, malware planting or direct physical access by Universal Serial Bus (USB) devices, and other hardware vulnerabilities are frequently targeted by attackers.

Consequently, regardless of the environment, attackers can take advantage of an IoT system's flaws to acquire unauthorized access and modify customer settings. Although specific devices function via Secure Sockets Layer/Transport Layer Security (SSL/TLS) protocol, which provides a digital certificate that allows systems to verify the identity of and subsequently establish an encrypted network connection to another system, hackers continue to develop new methods of circumventing security and intercepting communication between the target devices.

Being a hundred percent secure in cyberspace with more than 25 trillion devices is quasi-impossible. Most intrusion detection and intrusion prevention systems contain a list of attacks signatures in their database, limiting the potential of the tools to alert the user when there is new attack traffic coming from resource constrained devices. The challenges highlighted previously thus expose devices to different types of attacks, such as the Mirai Botnet attack, the Denial of Service (DoS) Synflood attack, the Man in the Middle (MIM) attack, and many others.

Furthermore, intelligent home automation systems, medical Internet devices, and building automation equipment handle sensitive user information that must be appropriately monitored. As a result, proposing an Intrusion Detection System (IDS) for IoT devices is vital to limit the threat surface and protect consumer data. Many literature reviews have proposed a solution using Deep Learning (DL) models. However, Deep Learning requires high processing power, unsuitable for constrained devices.

Given that many devices used in an IoT system have little capacity and can send small bits of data into a central network, more than 90% of IoT devices' data are unencrypted, opening doors to cyber-attack. Increasingly, hackers are now exploiting these edge device vulnerabilities to cause harm to IoT platforms.

To improve the security of the smart gadgets that are becoming increasingly prevalent in our everyday lives, threat modeling should be addressed early in any system's development cycle to ensure that a system is as secure as possible. Although threat modeling may be carried out at any point during the creation of a system, incorporating it throughout the development stage allows developers to stay ahead of new risks, improve a system's security, protect customers' safety, and deliver solutions that save both time and money for all parties involved.

SUMMARY OF THE INVENTION

Methods and systems for securing IoT automation devices, particularly a subset of IoT devices consisting of smart home automation devices such as intelligent cameras, doorbells, light switches, baby monitors, and many other home appliances, are disclosed. A testbed comprising more than fifty IoT devices with various protocols was developed. Several different types of attacks were orchestrated, including Man-in-the-Middle (MIM) and Denial of Service (DoS) attacks, to understand the devices' behavior and data patterns at the network level in the event of a security breach. Further, due to the lack of specialized cyber threat data and preprocessing tools, a novel packet capture (PCAP) parsing tool was developed to extract meaningful patterns from the captured dataset. The tool has been tested on real-world attacks and normal traffic data. The framework can process large amounts of data at a high rate. The estimated processing time of more than one million packets is seven minutes and twelve seconds. Finally, an ensemble machine learning (ML) based Intrusion Detection System (IDS) was built as a countermeasure to minimize the threat surfaces between the IoT cloud platform and edge devices. The techniques contribute to identifying the attacks directed through resource constrained devices.

In a first embodiment, a computer-automated method of modeling intrusion detection on an IoT network includes preprocessing a set of raw data packets received from one or more entities on the IoT network, wherein the preprocessing includes receiving the set of raw data packets from the one or more entities on the IoT network; converting the raw data packets to a PCAP file; converting the PCAP file to a comma separated value (CSV) file; filtering the CSV file to create a normal CSV file and an abnormal CSV file; merging the normal CSV file and the abnormal CSV file to create a merged file; removing redundant data in the merged file; adding the merged file to a concatenated file with other merged files; and extracting features from the concatenated file to create a set of extracted features. Further, the method includes building a test machine language (ML) model using the set of extracted features; determining at least one ML classifier of a set of ML classifiers based on the test ML model; and building an ensemble ML model from the set of ML classifiers. The filtering of the method can include extracting and deleting packet headers of the CSV file before creating the normal CSV file and the abnormal CSV file.

Additionally, the method can include identifying an attack in the abnormal CSV file and labeling the features as being associated with the attack and classifying the attack as an attack type based on the features. The method can further run additional raw data packets from the IoT network through the ensemble ML model to detect another attack of the attack type.

In generating an ensemble set of ML classifiers, the method can include selecting a first ML classifier to include in the set of ML classifiers that detects a first attack during training of the test ML model. The ensemble set of ML classifiers can include one or more of Logistic Regression, Decision Tree, Random Forest, AdaBoost, Gradient Boosting, eXtreme Gradient Boosting (XGB), XGB Random Forest (XGBRF), K-neighbor, Light Gradient Boosting Machine (LGBM), and Support Vector Machine (SVM) classifiers.

In building an ensemble ML model and the ensemble set of ML classifiers, the method can include splitting the set of extracted features into test data and training data. For example, the test data can include 20% of the set of extracted features while the training data can include 80% of the set of extracted features. The ensemble set of ML classifiers can then be determined from the training data, while each ML classifier of the ensemble set of ML classifiers can be determined from unique features in the test ML model. Thus, the test ML model can be built from the test data, while the ML classifiers can be built from the training data.

Further, the method can create other files in the merged files by preprocessing a corresponding other set of raw data packets from the one or more entities on the IoT network. The ensemble ML model can be further built from additional extracted features resulting from the preprocessing of the corresponding other set of raw data packets for each of the other merged files.

As the method progresses, the further built ensemble ML model can be used to create additional ML classifiers, thus building an ensemble set of ML classifiers. The ensemble set of ML classifiers can dynamically detect attacks of multiple different attack types, which attack types may evolve in the IoT network in real time as other attacks are identified.

The computer-automated method can also include evaluating metrics associated with the detection of the other attacks and updating at least one ML classifier of the set of ML classifiers based on the metrics. The method can also include evaluating aggregated metrics associated with the detection of the attacks of multiple different attack types and updating the set of ML classifiers based on the aggregated metrics.

In another embodiment, a system for modeling intrusion detection on an IoT network includes at least one device having one or more processors and memory storing computer-executable instructions that, when executed by the one or more processors, cause the device to perform the methods described above. A person having ordinary skill in the art (POSITA) would understand that variations of the system having components performing all or some of the functions are within the scope of this disclosure. Further, the system can incorporate components and functions in support of this disclosure and as complementary to the IDS embodiments described herein as disclosed in U.S. Non-Provisional application Ser. No. 18/419,037, titled "Detection and Survival Method Against Adversarial Attacks on Automated Systems," filed with the USPTO on Jan. 22, 2024, for example, and as would be understood by such POSITA for IDS configurations in general.

In still other embodiments, non-transitory computer-readable media storing computer-executable instructions cause embodiments of the disclosed system to perform the methods described above when the computer-executable instructions are executed by the one or more processors of such disclosed systems.

BRIEF DESCRIPTION OF THE DRAWINGS

The numerous advantages of the present invention may be better understood by those skilled in the art by reference to the accompanying drawings in which:

FIG. 8 illustrates how the disclosed IDS incorporates Welford's Technique to compute sample variance for packets incrementally for improved processing metrics, according to some embodiments.

DETAILED DESCRIPTION OF THE INVENTION

Figure 1:
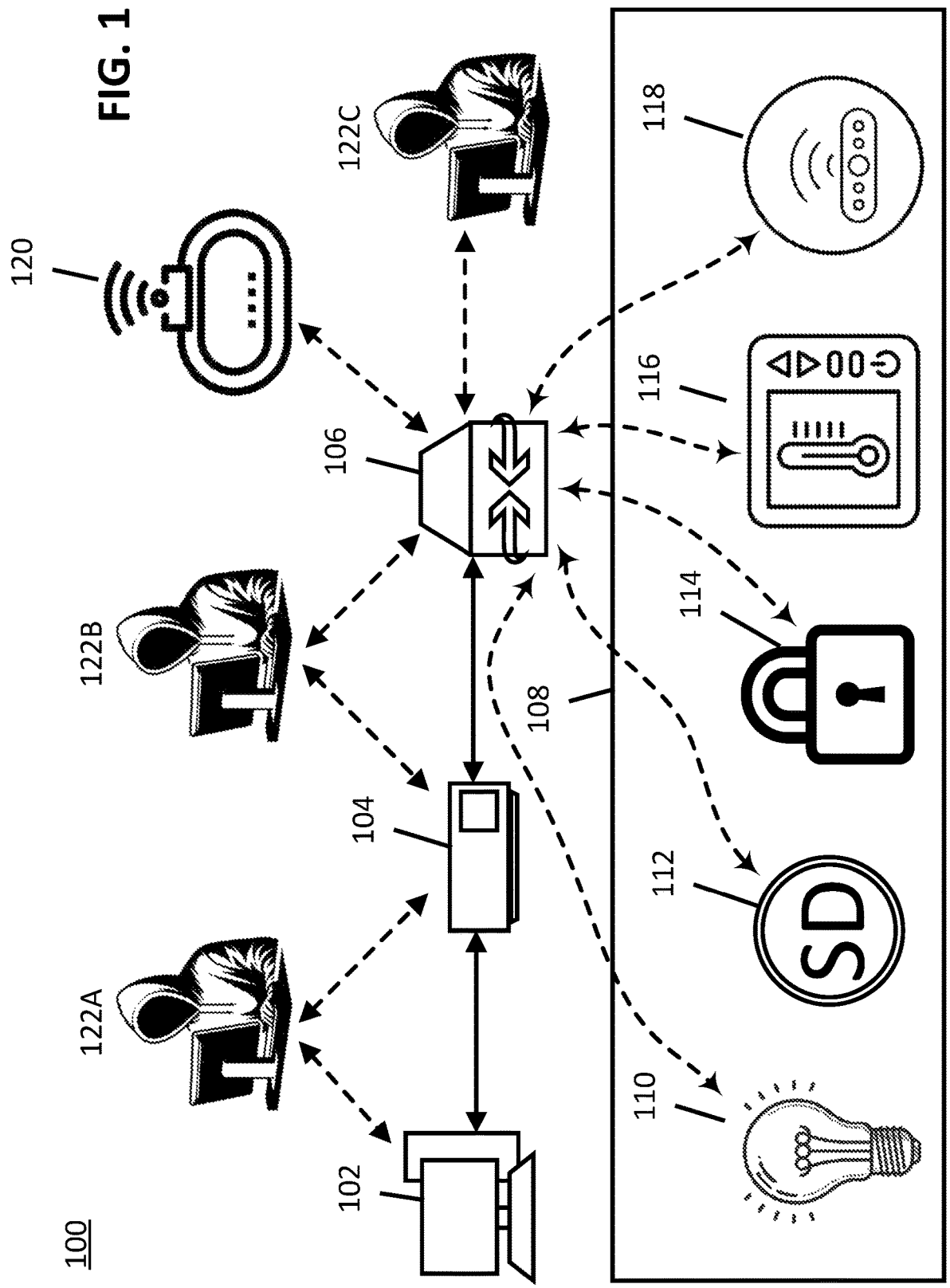
FIG. 1 illustrates a typical configuration of an IoT network, according to some embodiments.

The invention summarized above may be better understood by referring to the following description, claims, and accompanying drawings. A description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to limit the present disclosure. As used herein, the singular forms "a," "an," and "the" are intended to include the plural forms as well, unless the context clearly indicates otherwise. Furthermore, the use of the terms a, an, etc. does not denote a limitation of quantity, but rather denotes the presence of at least one of the referenced items.

The use of the terms "first," "second," and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

While the IoT market continues to grow, cloud service providers and researchers are looking for new methods to enhance the platform's security. Due to the technical requirements and characteristics of both open source and commercial IoT platforms, such IoT platforms inherently experience platform vulnerabilities that emerge from an IoT gateway that communicates with the backend of an IT system. The most severe vulnerabilities can be found on IoT devices at the edge of the IoT system because cloud providers have no control over the security of the devices that are interfering with the platform. Because of their low power and memory needs, IoT devices cannot perform complicated algorithms, posing a threat to the cloud computing platform. Attackers use the vulnerabilities in IoT devices to enter the IoT platform, allowing the attackers to take control of the platform.

MIM and DoS attacks, for example, were conducted on an intelligent testbed to better understand the behavior of the IoT devices and assess the impact of the attacks. To determine the success of the disclosed countermeasure embodiments for IoT platform security, vulnerabilities from entities interfering with the platform were simulated. Misconfiguration, unpatched software leading to a potential attack, a lack of proper security built-in constraint devices, and firmware upgrades, for example, were considered. As part of the countermeasure approach, normal and malicious data traffic from the intelligent testbed were collected and analyzed to identify trends. A supervised machine learning (ML) technique was applied to identify various attacks from the smart gadgets in the IoT environment. Cloud providers could integrate the disclosed IDS systems and methods into their backend systems or have such systems and methods operate in their gateways to monitor traffic and identify attacks organized by IoT devices with little resources.

The following describes embodiments of methods and systems to capture and parse intrusion data and apply ML techniques to effectively support a more robust IDS. Embodiments of an IDS include a framework with multiple ML classifiers to model and detect various attacks. In one example embodiment, at least ten ML classifiers were evaluated against a variety of multiple types of attack data. The accuracy of each classifier was recorded as follows: LR (Logistic Regression) has 97%, SVC (Support Vector Machine) has 98%, Extreme Gradient Boosting Random Forest (XGBRF) has 99%, K-Nearest Neighbors (KNN) has 99%, AdaBoost (AB) is 99% accurate, Random Forest (RF)

has 99%, Decision Tree (DT) has 99%, and Extreme Gradient Boosting (XGB) has 99%. Finally, additional critical parameters were considered to enhance the overall efficacy of the IDS. A POSITA would understand that various other ML techniques and algorithms could be applied.

In some embodiments, a method employs certain known methodologies as building blocks, such as threat analysis, threat modeling, and analytics. The purpose of threat modeling is to prepare a system to avoid future threats and assaults by identifying system weaknesses. The disclosed method allows for the identification and analysis of possible attackers, the determination of their objectives and tactics, and the development of remedies and mitigation plans. In one example embodiment, the method allows identification of several entry points, such as SPI, UART, USB, Pulse— With Modulation (PWM), and In-Circuit Serial Programming (ICSP), that attackers may use to access a system microcontroller and launch an attack.

In some embodiments, the method employs Common Attack Pattern Enumeration and Classification (CAPEC) analysis. CAPEC is a framework for a better understanding of adversaries (attackers) and attack methods (threats). CAPEC threat modeling can help security practitioners better understand potential threats to applications and IT systems. CAPEC provides a list of common attack methods and patterns used by attackers to attack applications and IT systems. This is useful because most attacks follow a certain pattern, and an understanding of these patterns enables development of mitigations for these attack patterns. Each CAPEC attack pattern describes how attackers can breach applications, including the common steps involved to use the attack pattern. With its typical assault patterns, CAPEC serves as a threat library, exposing the complexity and possibility of an attack. Such attack threats defined in CAPEC are CAPEC-94 (Man-in-the-Middle), CAPEC-615 (Evil Twin), CAPEC-651 (Eavesdropping), CAPEC-469 (Denial of Service), and CAPEC-151 (Spoofing), CAPEC-81 (Access to Data Logs), for example. An understanding of traditional attack patterns provides a foundation for attack analysis disclosed herein.

In some embodiments, the method then employs STRIDE threat modeling to identify and evaluate different threats to the system microcontroller, including spoofing (identifying authentication issues involving actors pretending to be something or someone other than what or who they are), tampering (identifying integrity issues, e.g., the modification of data on parts of the network, such as a storage location), repudiation (identifying actors that deny responsibility for their actions), information disclosure (identifying confidentiality issues involving actors obtaining information that they are not allowed to access), denial of service (identifying availability issues involving exhausted resources that are needed to provide service), and elevation of privilege (identifying lack of authorization for actors attempting to perform unauthorized actions).

In some embodiments, STRIDE threat modeling is used in conjunction with a model of the target system that is constructed in parallel. For construction of the model, including a full breakdown of processes, data stores, data flows, and trust boundaries, some embodiments of the system utilize the pythonic framework (Py™), a code-based solution utilizing a collection of Python modules that provides a set of common functionality for building applications of any type. Py™ enables developers to automate constructing a threat model for any system. Further, some embodiments of the system use a tool for visualizing a system or plant, such as PlantUML. For example, PlantUML.jar is a component that allows creation of various Unified Modeling Language (UML) diagrams through simple textual descriptions for visualizing representations of complex systems, such as sequence and deployment diagrams.

In some embodiments, a threat modeling tool, such as the Microsoft Threat Modeling Tool, can be used to identify and mitigate potential security issues. Such a tool provides automation for threat model development and diagramming, in which guided STRIDE analysis of threats and mitigations can be considered for focused design analysis, regarding each element of the resulting diagram(s), as further illustrated and described below. The threat modeling methodology applied herein provides a list of risks that demonstrate the threats that are exposed to the IoT system's microprocessor board and recommends various mitigation strategies. From the threat list, the program generates a threat report, a structured document that presents all dangers and mitigations present in the environment.

For example, for a spoofing (authentication) threat, recommended mitigation might be creating a sufficient password. For a tampering (integrity) threat, recommended mitigation might be using a digital signature to enhance the security of the board. For a repudiation threat, usage of a digital signature might be recommended. For an information disclosure (confidentiality) threat, encryption, such as an encrypted password, might be recommended. For a DoS threat, the usage of firewalls to block unknown data traffic might be recommended. For an elevation of privilege threat, the tool might recommend securing the input data, such as by encryption, for example.

Further, a built-in application programming interface (API) and Software Development Kits (SDKs) are used to develop or construct new applications and gateways for connecting to third-party systems. For example, IoT Hub, a cloud gateway for data management in an intelligent home-based device that connects with the Microsoft Azure Cloud platform, can be used.

FIG. 1 depicts a typical configuration of an IoT network 100. An attacker 122A, 122B, 122C can discover open ports that are made available to devices 108 (including, for example, light sensor(s) 110, smoke detector(s) 112, door lock(s) 114, thermostat(s) 116, and a myriad of other sensor (s) 118) that are normally authorized by network administrator 102 to use the IoT network 100. Attacker 122A, 122B, 122C can exploit the IoT network 100 at a router 104 or gateway 106, adversely affecting control, monitoring, or other interaction by IoT hub 120. In this way, hacker sensors can exploit vulnerabilities to gain unauthorized access using MIM or DoS attacks, for example. Methods and systems described herein can assess such threats to various IoT platforms, like the IoT network configuration in FIG. 1, based on the functional capabilities and security features of the IoT platforms, for both open source and commercial platforms.

Figure 2:
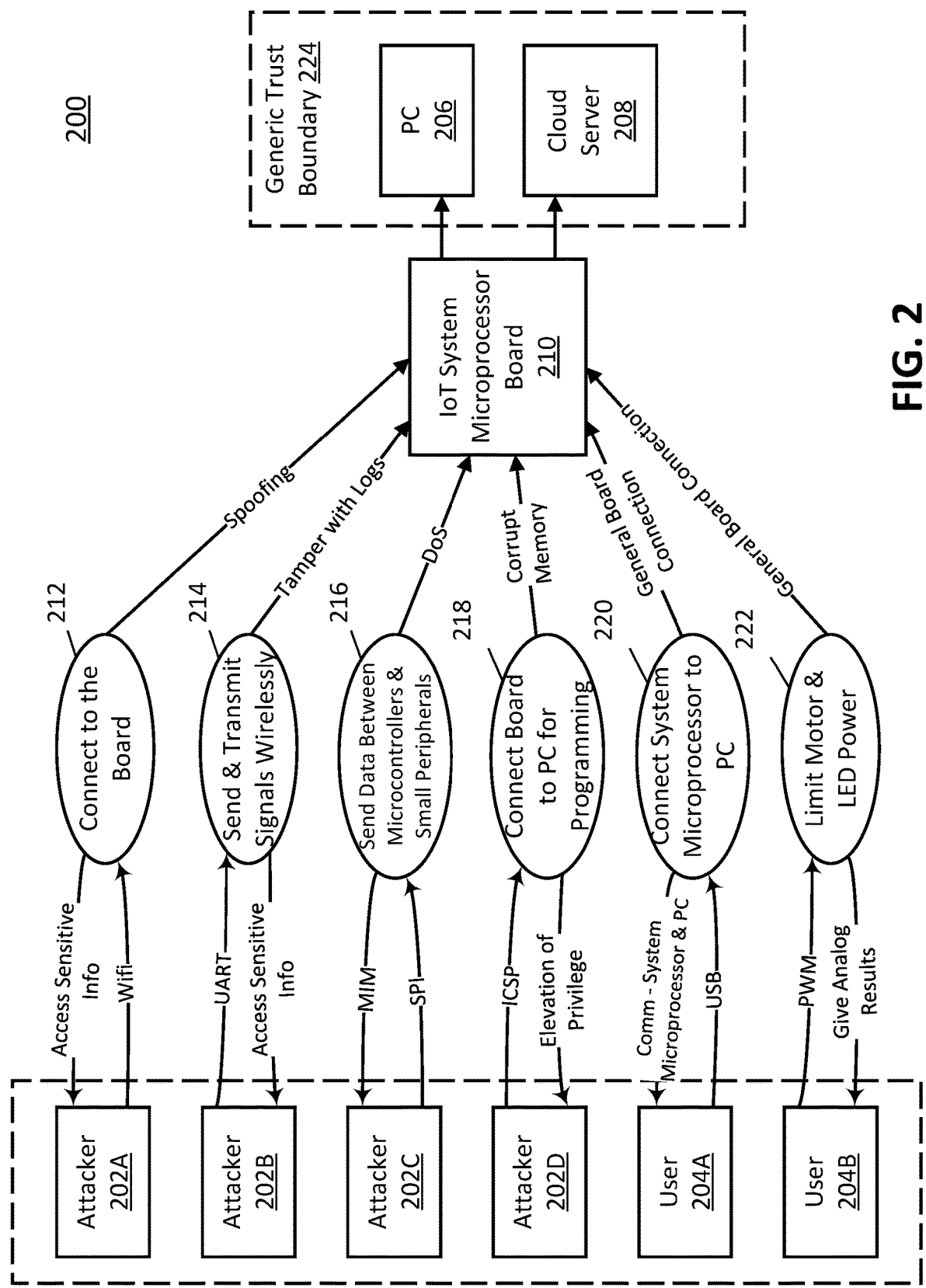
FIG. 2 illustrates an example of a data flow diagram (DFD) produced by an IDS employing automated threat modeling to model threats for an example IoT network, according to some embodiments.

FIG. 2 illustrates an example of a data flow diagram (DFD) 200 produced by an intrusion detection system (IDS) employing automated threat modeling to model threats for an example IoT network. In some embodiments, a threat modeling tool, such as the Microsoft Threat Modeling Tool previously described, can be used to identify and model threats for a given IoT system. FIG. 2 illustrates an example threat model depicting data flow diagramming, in which guided STRIDE analysis of threats and mitigations can be considered, with regard to attackers' specific purposes for intrusion, for focused design analysis.

In at least one embodiment, the DFD 200 shown in FIG. 2 includes a list of possible threats that are generated for the IoT system microprocessor 210, which can be a part of or in communication with gateway 106. IoT system microprocessor 210 can be any of a number of development boards with a microcontroller sufficient for performing the processing described herein. For example, the Arduino Mega model 2560, an open-source development board with microcontroller, may be used. The Arduino Mega board has multiple analog and digital inputs and outputs pins, a Universal Asynchronous Receiver and Transmitter (UART) interface, an oscillator with 16 MHz frequency, a Universal Serial Bus (USB), an In-Circuit Serial Programming (ICSP) interface, a Pulse Width Modulation (PWM) chip, a reset button, different power sources and the integrated Wifi and Bluetooth modules. Some of the roles of the IoT system microprocessor 210 include authenticating, registering, managing, controlling, and/or monitoring sensors 108 in the IoT system 100.

Further in reference to FIG. 2, PC 206 can be equivalent to or part of network administrator 102. PC 206 can further be in communication with cloud server 208 for communicating outside of the IoT system, such as IoT system 100. PC 206 and cloud server 208 are within a generic trust boundary 224 in which PC 206 and cloud server 208 exchange trusted communications. However, beyond the trust boundary 224, PC 206 and cloud server 208 consider IoT system microprocessor 210 an untrusted source for which automated threat modeling serves to detect and contain threats within the IoT system, such as IoT system 100, controlled by IoT system microprocessor 210.

FIG. 2 illustrates such modeled threats on the IoT system 100 by Attackers 202A-D, which can be the same or different attackers, and which can be the same or similar to Attackers 122A-C of FIG. 1. In a first modeled threat, an external destination entity Attacker 202A connects 212 to the IoT system microprocessor 210 via Wifi. Such threat is categorized by the threat modeling tool as a spoofing threat in which Attacker 202A spoofs a legitimate user, process, or entity to gain access to sensitive data via Wifi. In this case, Attacker 202A poses, or substitutes, as something other than itself. Examples of such spoofing include substituting a process, a file, a website, or a network address. An attacker may spoof the user, sending data to the attacker's target instead of the user. By identifying the possible threat to the system and modeling its interaction, IoT system 100 can prioritize such a threat and be prepared to mitigate it when it occurs. For mitigating such a threat, the threat modeling tool may recommend using a standard authentication mechanism to identify the external entity, such as having strong Wired Equivalent Privacy (WEP)/WiFi Protected Access (WPA) encryption on access points, having stronger router login credentials, or using a Virtual Private Network (VPN), for example.

In a second modeled threat illustrated by FIG. 2, Attacker 202B potentially denies receiving data and gains access to sensitive data via UART. Such threat allows Attacker 202B to send and transmit signals wirelessly 214, which allows Attacker 202B to tamper with logs sent to IoT system microprocessor 210. Such threat is categorized by the threat modeling tool as a repudiation threat involving an adversary denying something happened. In this case, Attacker 202B claims that it did not receive data from a process on the other side of the trust boundary 224. For mitigating such a threat, the threat modeling tool may recommend using logging or auditing to record the source, time, and summary of the received data for validation of the sender and its data.

In a third modeled threat illustrated by FIG. 2, Attacker 202C causes a denial of service (DoS) when it enters the IoT system via a Serial Peripheral Interface (SPI) to send bad data between microcontrollers and small peripherals in the IoT system. A DoS is sent to the IoT system microcontroller 210 from the affected entities when the process or a datastore associated with the entities cannot service incoming requests or perform up to specification. The result is a man-in-the-middle (MIM) attack because the affected entities will send requested information back to Attacker 202C instead of a valid user, thus disclosing information to an undesirable party. For mitigating such a threat, the threat modeling tool may recommend techniques to establish better user authentication for entities addressing microcontrollers and small peripherals in the IoT system.

In a fourth modeled threat illustrated by FIG. 2, Attacker 202D attacks via the In-Circuit Serial Programming (ICSP) interface to connect the IoT system microcontroller 210 to the PC 206 for programming (at 218). The IoT system microcontroller 210 provides an elevation of privilege to the Attacker 202D. Attacker 202D can then interrupt data flow. This can cause a denial of service or disable the datastore from servicing incoming requests. Thus, memory on the IoT system microcontroller 210 can be corrupted.

The first through fourth modeled threats are in contrast to normal communications for general board connections. For example, as illustrated, User 204A communicates normally over USB to connect IoT system microprocessor 210 and PC 206 (at 220) for normal communications, and the IoT system microprocessor 210 provides these communications to User 204A. As another example, User 204B makes another general board connection over the PWM interface to limit motor and LED power (at 222). The IoT system microprocessor 210 provides analog results to User 204B.

Figure 3:
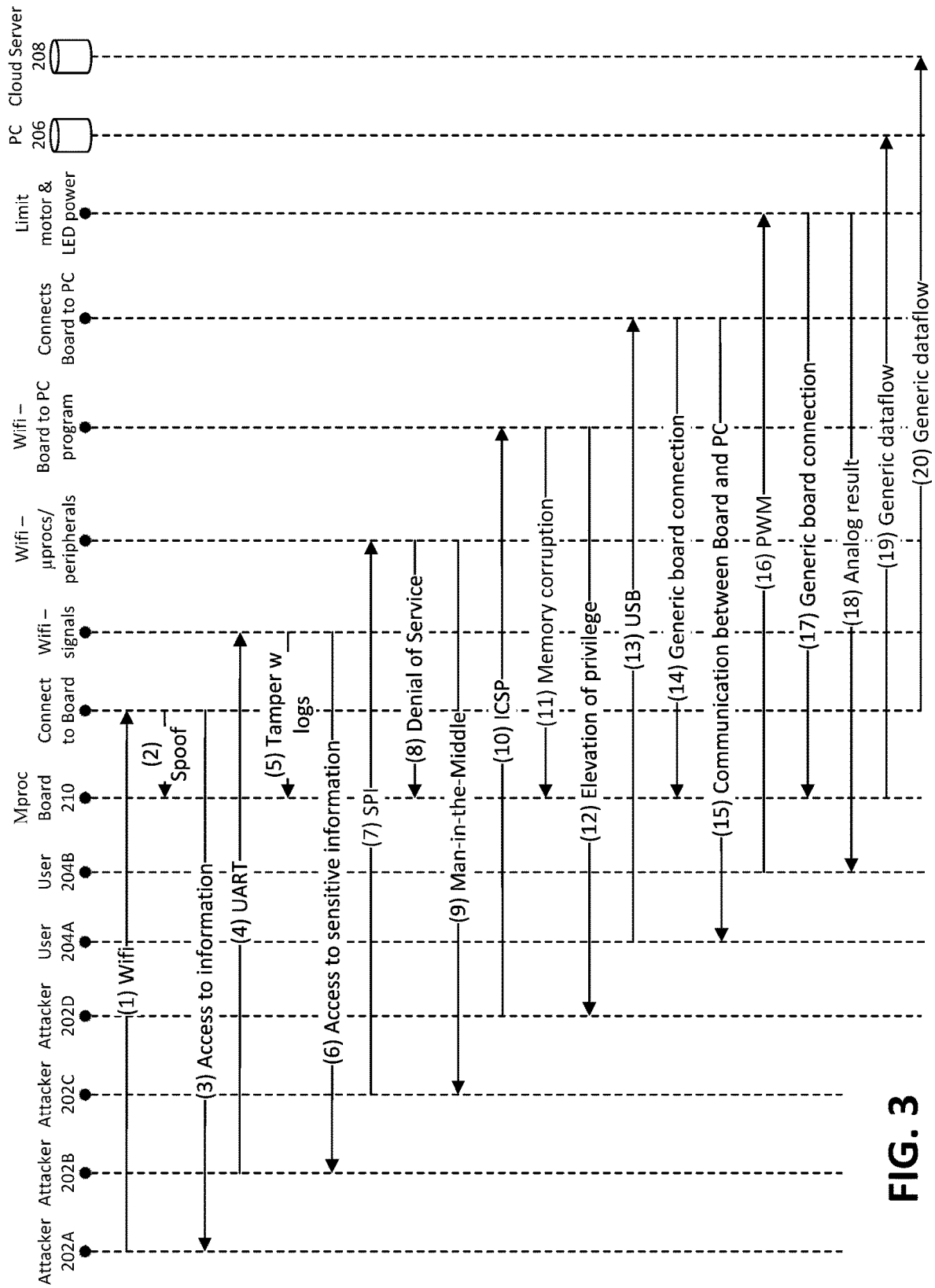
FIG. 3 illustrates a sequence diagram depicting an example of a step-by-step procedure by which one or more attackers may launch an attack and gain access to and control over an IoT system.

FIG. 3 illustrates a sequence diagram depicting an example of a step-by-step procedure by which one or more attackers may launch an attack and gain access to and control over an IoT system. The sequence diagram tracks the illustrations of FIG. 2. The sequence diagram illustrates the IoT system's microprocessor board's (e.g., microprocessor 210's) entry points and documents the process of an attack according to the board components and priority. Specifically, the first modeled threat from Attacker 202A in FIG. 2 is represented by steps (1)-(3) in FIG. 3. The second modeled threat from Attacker 202B in FIG. 2 is represented by steps (4)-(6) in FIG. 3. The third modeled threat from Attacker 202C in FIG. 2 is represented by steps (7)-(9) in FIG. 3. The fourth modeled threat from Attacker 202D in FIG. 2 is represented by steps (10)-(12) in FIG. 3.

In each case of attack detection such as those shown in FIGS. 2 and 3, the threat modeling tool can assign a priority to each threat based on overall impact, probability, cost to clean from the system, etc. For example, the first, second, and third modeled threats may be considered high or medium priority because the threats could result in providing an attacker access to sensitive data. However, the type of data provided may suggest a lower priority.

Figure 4:
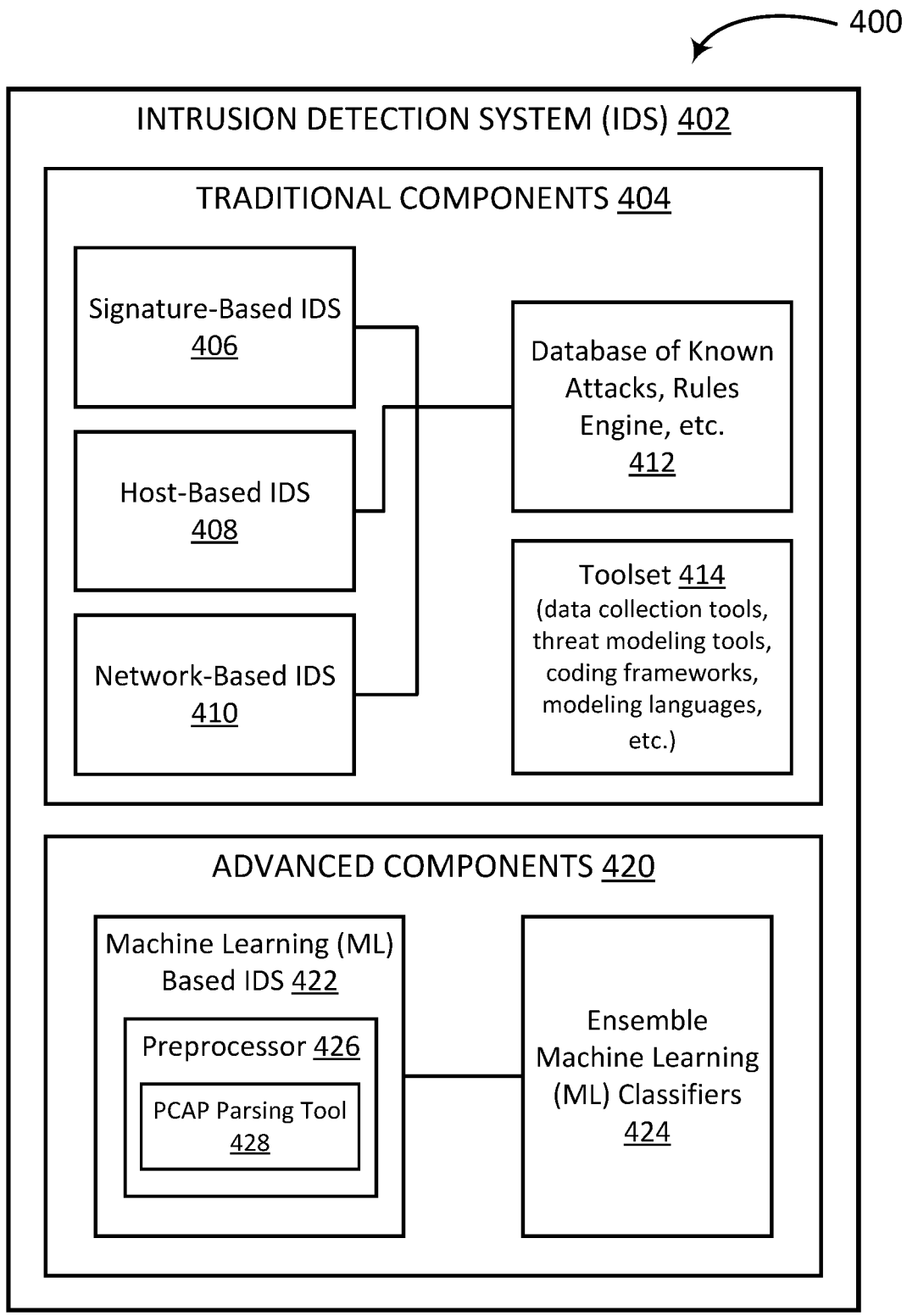
FIG. 4 illustrates an intrusion detection system (IDS) utilizing traditional intrusion detection components complemented by a machine learning (ML) based IDS implementing ensemble ML classifiers, according to some embodiments.

FIG. 4 illustrates an intrusion detection system (IDS) 400 utilizing traditional intrusion detection components 404 complemented by advanced components 420 including a machine learning (ML) based IDS 422 implementing ensemble ML classifiers 424, according to some embodiments. A typical IDS may use several different techniques to detect malicious network activity. Traditional components 404 of an IDS 402 for detecting malicious attacks may include signature-based IDS 406, host-based IDS 408, and network-based IDS 410 components. Each of these traditional components utilize a database of known attacks, rules engine, etc. 412, which is available to the system for comparison to and analysis of IoT system data (e.g., network traffic, such as requests, responses, and handshakes). For example, a signature-based IDS 406 identifies data having unique patterns or identifiers in network traffic that indicate malicious activity or unauthorized access, compares the data to known signatures in a database, and generates an alert when a match is found. Signature-based detection is common to antivirus tools, for example. Signature-based IDS solutions are limited in that they are unable to detect patterns or indicators of new threats that are not already known.

As another example of traditional components 404 of an IDS, host-based IDS 408 solutions operate on individual host systems, such as a server, a PC, or any other type of device that produces logs, metrics, and other data that can be monitored for security purposes. In comparison, a network-based IDS 410 solution monitors for suspicious activity from the perspective of the network, by analyzing network data sources such as network switch logs for data indicating threat patterns or indicators. While a host-based IDS 408 similarly monitors network activity, it does so from the perspective of individual hosts, not centralized networking equipment like switches. Additionally, a host-based IDS 408 may use additional data sources over network data and thus can be more effective for various types of attack detection. However, like signature-based IDS solutions, both host-based IDS 408 and network-based IDS 410 solutions are limited in their effectiveness because they are limited to detection of known types of attacks and use established and static detection rules from such database of known attacks, rules engine, etc. 412.

Traditional components 404 of IDS 402 may utilize previously described tools and frameworks from Toolset 414 for data collection, threat modeling, coding, and analysis (e.g., CAPEC analysis, STRIDE threat modeling, code frameworks such as the Pythonic framework, threat modeling tools such as the Microsoft Threat Modeling Tool, UML tools such as PlantUML, etc.), to varying degrees.

Preferably, advanced components 420 are used in conjunction with traditional components 404 and Toolset 414 to provide context into actual network behavior that can be dynamically configured as new types of attacks arise. To that end, a machine learning (ML)-Based IDS 422 captures data from an IoT system (including various commercial IoT devices), extracts meaningful patterns that indicate possible suspicious activity from the captured dataset, and establishes new and ever-changing rules for detecting and classifying new attacks. ML-Based IDS 422 limits the threat surfaces between the IoT cloud platform and edge devices in an automated way. By contrast, viewing normal data traffic from IoT devices is a non-automated process for traditional IDSs.

Further, although established ML techniques such as logistic regression, decision tree, random forest, gradient boosting, and K-neighbor classification are applied, various aspects of the disclosed methods performed by ML-Based IDS 422 apply algorithms for automatically pruning the data, automatically selecting the most effective ML algorithm(s) for accurately and dynamically identifying possible attacks at a present time, and automatically determining a set of ensemble ML classifiers 424 to apply to present and new IoT system data for real-time attack detection. Thus, ML-Based IDS 422, utilizing ensemble ML classifiers 424, is not limited to detection of known types of attacks as would only be possible for traditional components 404 by applying detection rules and pattern data from database of known attacks, rules engine, etc. 412.

Specifically, ML-Based IDS 422 includes Preprocessor 426 for preparing IoT system data for establishment and dynamic maintenance of ensemble ML classifiers 424. Preprocessor 426 is a unique tool to assist practitioners in leveraging the gaps identified by other data collection tools. IoT devices generate enormous amounts of data, necessitating an efficient tool capable of performing real-time processing. Whereas traditional tool CICFlowMeter uses lists of all of the packets captured to calculate the mean, variance, and standard deviation from a few metrics such as packet length, flow interval, arrival time, and flow active/idle time, it repeats the calculation of the list of packets at each iteration, which requires considerable processing time and power. To get around this problem, Preprocessor 426 adds CICFlowMeter metrics to a repository and applies Welford's technique to compute each packet incrementally. FIG. 8 illustrates how the disclosed IDS incorporates Welford's Technique to compute sample variance for packets incrementally for improved processing metrics, according to some embodiments. Welford's technique compares the sums of squared differences for M and M−1 data to compute sample variance of the data, as shown in FIG. 8.

A novel packet capture (PCAP) Parsing Tool 428 was developed for Preprocessor 426 to extract meaningful patterns from a captured IoT system dataset. PCAP files contain the raw data of network packets captured from a network interface, including headers and payloads of each packet. Various packet capture tools exist that capture and analyze PCAP files for detecting, investigating, and diagnosing network security incidents, troubleshooting network issues, analyzing protocols for identifying vulnerabilities and developing mitigation strategies, and monitoring network performance. However, existing tools are limited as to processing performance and effectiveness in adapting to changing security environments with new vulnerabilities.

Using PCAP Parsing Tool 428, Preprocessor 426 can ingest raw packet files and apply specific scripts and filters, merge and concatenate files, and apply ML techniques on the combined data more efficiently and accurately than known tools. For example, in the process of applying the PCAP Parsing Tool 428 on a captured dataset, packet headers are not saved, resulting in less processing time. In testing, Preprocessor 426 performed significantly better in terms of processing time than other techniques such as Argus, nProbe, Zeek, Shark, and CICFlowMeter, with Preprocessor 426 processing at a rate of 1 M packets in 7 minutes and 12 seconds compared to 20 to 50 minutes for these other techniques. Further, the PCAP parsing tool 428 has been tested on both real-world attacks and normal traffic data and shown to prepare datasets for identifying possible attacks more effectively than other detection tools for similar attack datasets collected from commercial IoT devices.

Figure 5:
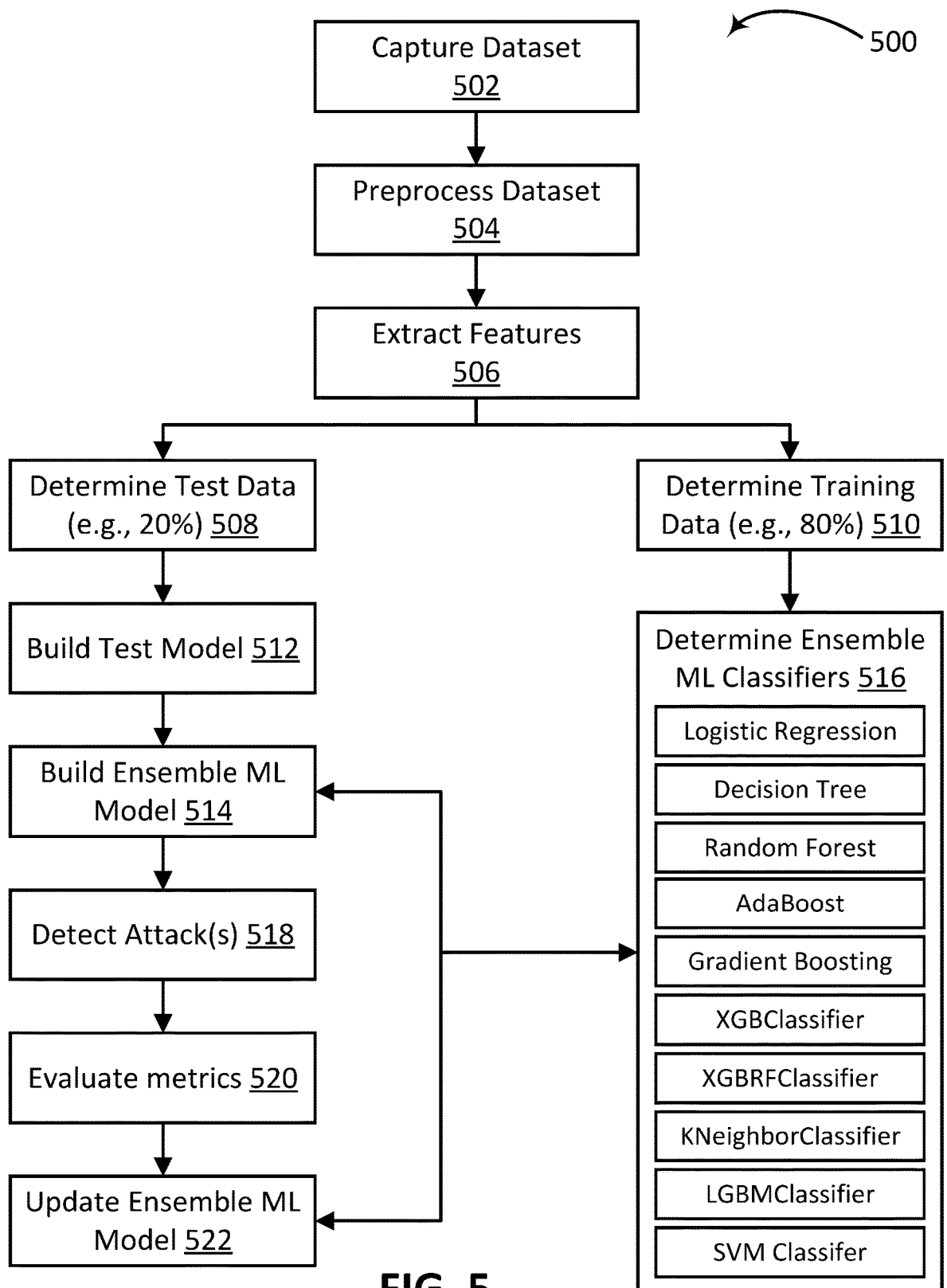
FIG. 5 illustrates a method for capturing, preprocessing, and extracting intrusion data from an IoT system to determine ensemble ML classifiers for building intrusion detection models, according to some embodiments.

FIG. 5 illustrates a method 500 for capturing, preprocessing, and extracting intrusion data from an IoT system (such as IoT system 100) to determine ensemble ML classifiers 424 for building dynamic intrusion detection models for an ML-based IDS 422, according to some embodiments. Method 500 utilizes Preprocessor 426 with PCAP Parsing Tool 428. In step 502, a dataset of raw packet data is captured from network data sent over an IoT network. Such raw packet data may be sent by or be affected by attackers 122A-C of FIG. 1, for example. In step 504, the dataset is preprocessed using Preprocessor 426 with PCAP Parsing Tool 428 according to the method of FIG. 6. In step 506, features in the preprocessed dataset are extracted according to filtering rules for separating attack packets from benign packets. In steps 508 and 510, the dataset including extracted features identifying an attack are separated into test data and training data. For example, in step 508, 20% of the dataset is used for test data, and in step 510, the other 80% of the dataset is used for training data.

Additionally, or alternatively, the network traffic packets are examined based on their potential source and destination IP addresses. Through this method, ML-Based IDS 422 can determine flow direction, analyzing source/destination from components of an IP address. Because an IoT system's microprocessor can have many access points into which various attacks can flow, the method is effective at concentrating the data at the access points for identification and processing of attacks regardless of their source or destination.

From the test data, in step 512, a test ML model is built. In step 514, using an ensemble of ML classifiers arranged for identifying various types of attacks, an ensemble ML model is built for specific attacks that are found in the features of the preprocessed dataset. In step 516, such ensemble ML classifiers are determined from the training data determined in step 510. For example, depending on a type of attack determined from the captured features, one or more ensemble ML classifiers can be determined as logistic regression, decision tree, random forest, AdaBoost, gradient boosting, eXtreme Gradient Boosting (XGB), XGB Random Forest (XGBRF), K-neighbor, Light Gradient Boosting Machine (LGBM), and/or support vector machine (SVM) classifiers, for example.

In step 518, the ensemble ML model can be used to detect one or more attacks of different attack types, for example, as disclosed herein. As the ensemble ML model is used to determine new attacks, new ML classifiers may be determined to feed back into and enhance the set of ensemble ML classifiers. This in turn allows the ensemble ML model to be further developed from the enhanced set of ensemble ML classifier. In step 520, metrics are determined from the data and evaluated for effectiveness in detecting attacks. Classification metrics can include accuracy, recall, and f1 score per class, for example. In addition, true and false positives, true and false negatives, can be used to calculate the metrics. Thus, there are four possible outcomes: true, false, and whether the predictions determining an attack were correct or not. Such outcomes can include:

True Negative (TN): a case in which the actual label was negative and predicted negative;

True Positive (TP): a case in which the actual label was positive and predicted positive;

False Negative (FN): a case in which the actual label was positive but predicted to be negative; and False Positive (FP): a case in which the actual label was negative but predicted positive.

Further, the precision represents how accurate the predictions are in the model. Precision is defined as the ratio of true positives to the sum of true and false positives for each class. Recall represents the percentage of positive cases detected in the model. Recall is defined as the ratio of true positives to the sum of true positives and false negatives. Accuracy is the number of correct predictions, which includes both positive and negative predictions, divided by the total number of predictions made. Score F1 represents the percentage of correct positive predictions. Score F1 is a weighted harmonic average of precision and recall such that the best score is 1.0, and the worst is 0.0.

In step 522, the ensemble ML model can be updated, using the enhanced ensemble ML classifiers, for further use in an IDS to detect new and evolving attacks. Both the ensemble ML model and the set of ensemble ML classifiers can be continuously improved as an IDS is used in a fielded IoT system, thus continuously improving the ability of the IDS to detect and prevent threats in the IoT system.

Specifically, the system performing method 500 can evaluate the metrics associated with the detection of each attack and update at least one ML classifier of the set of ensemble ML classifiers based on the metrics. Further, aggregated metrics associated with the detection of the attacks of multiple different attack types can be used to update the set of ensemble ML classifiers based on the aggregated metrics.

Figure 6:
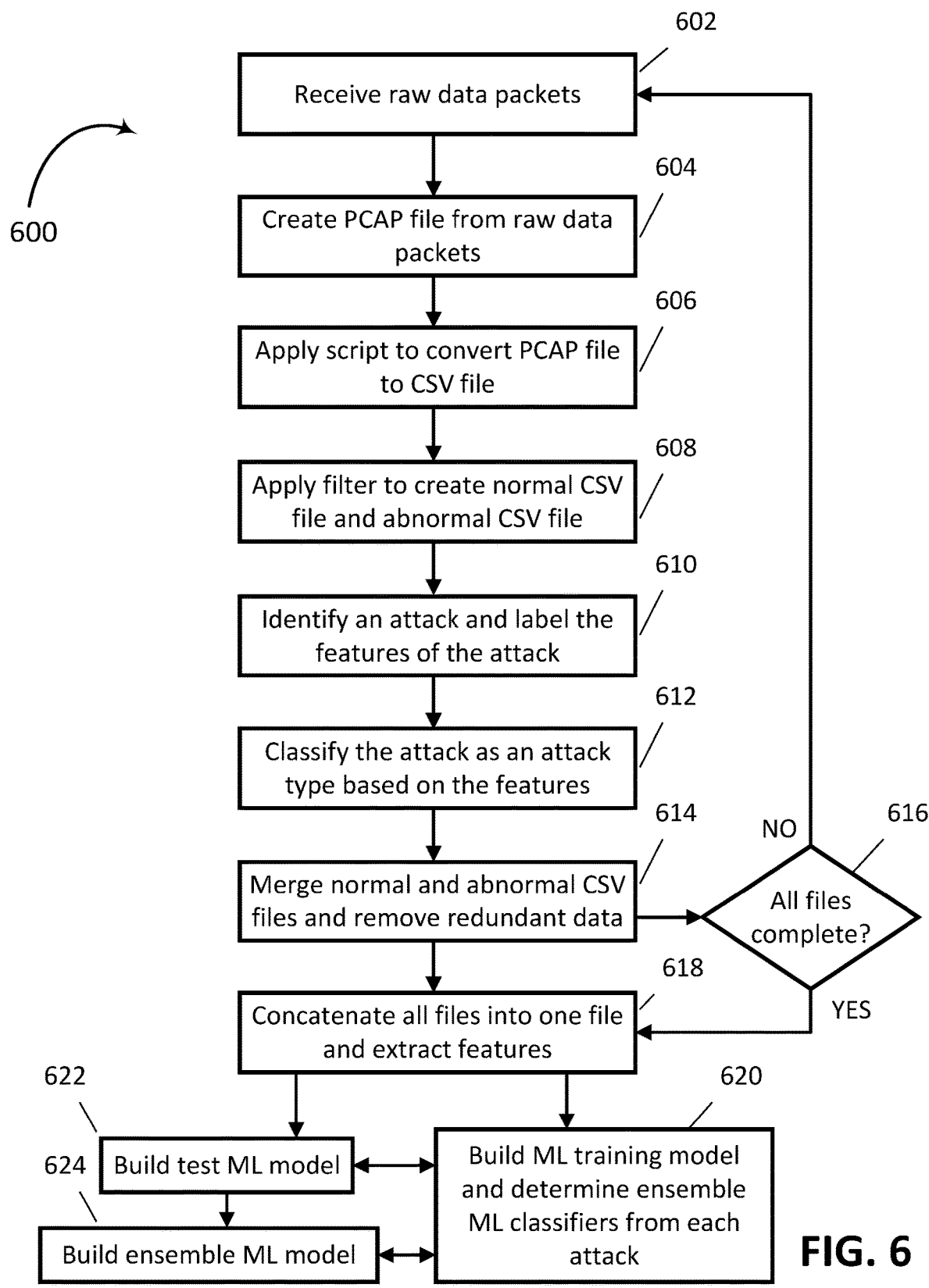
FIG. 6 illustrates a method of preprocessing IoT system traffic to extract meaningful patterns for determining ensemble ML classifiers to be used in an ML-based IDS, according to some embodiments.

FIG. 6 illustrates a method 600 of preprocessing IoT system traffic to extract meaningful patterns for determining ensemble ML classifiers 424 to be used in an ML-based IDS 422 for threat modeling, according to some embodiments. Method 600 can be performed for automated intrusion modeling and detection on an IoT network. Method 600 utilizes Preprocessor 426 with PCAP Parsing Tool 428 and can perform the function of step 504 in FIG. 5 in which the method preprocesses a set of raw data packets from entities on the IoT network, such as the IoT network illustrated in FIG. 1. In step 602, raw data packets are received from one or more entities on the IoT network. Such raw data packets may be sent by or be affected by attackers 122A-C of FIG. 1, for example. Raw data packets may be captured using a packet capturing tool such as Wireshark, for example, at various time intervals.

In step 604, the method converts the raw data packets and creates, from the converted data, a packet capture (PCAP) file. In step 606, the method applies a script to convert the PCAP file to a comma separated value (CSV) file. In step 608, the method applies a filter to separate the data in the dataset, creating a normal CSV file and an abnormal CSV file, where the normal CSV file includes normal network traffic and the abnormal CSV file includes indications of abnormalities, such as would indicate a threat or intrusion by attackers 122A-C. A description file is provided in the dataset specifying the filtering rules for separating attack packets from benign packets.

In step 610, the method then identifies an attack in the abnormal CSV file. An attack may be identified in the data using the threat detection and modeling tools previously described herein. Once identified, the attack can be labeled by labeling the features of the attack that are found in the data. In step 612, based on the features, an attack can be classified as a specific attack type using predetermined models from the threat modeling tools described herein. In step 614, the normal CSV file and the abnormal CSV file can be merged to create a merged file. In merging the files, redundant data can be removed to reduce file size. Additionally, packet header data can be discarded to further reduce file size. Reduction of file size for the merged file allows for faster processing times and improved focus on the important data related to an identified attack.

In step 616, the method checks whether all raw data packets have been preprocessed. If not, the method continues to preprocess raw data packets from step 602. If so, the method continues to step 618. In step 618, the merged files are combined in a concatenated file, and attack features are extracted from the concatenated file to create a set of extracted features for further processing by an ML modeling and processing engine.

In step 622, similar to steps 508 and 512, a test ML model is built, using the extracted features, by first separating a portion of the data having the extracted features into test data. For example, 20% of the data may be portioned for building the test ML model. Continuing this example, the remaining 80% of the data may be portioned as training data for building an ML training model in step 620. Further in step 620, one or more ML classifiers can be determined as matching identified attack data and corresponding to an attack type. An ensemble set of ML classifiers, as illustrated in step 516 of FIG. 5, can be built from the determined ML classifiers and continually enhanced as more attacks are identified in attack data by performing method 600 on network data of the IoT system.

Continuing method 600, in step 624, the test ML model (as in step 512 of FIG. 5) can be used to build an ensemble ML model (as in step 514 of FIG. 5), which is enhanced with ML classifiers from step 620 specific to attacks that are identified and classified in the network data as an IDS operates on the IoT network in real time (according to steps 518, 520, and 522 of FIG. 5). In this way, both the ensemble ML model in step 624 and the ensemble ML classifiers in step 620 can be continuously enhanced for detecting further attacks, as attacks evolve on the IoT network. Attacks may evolve as Attackers 122A-C get more sophisticated or attempt different types of attacks, or as new attackers enter the IoT network.

The threat detecting and modeling process of FIGS. 5 and 6 may be carried out at any point during the creation of an IoT system, incorporating it throughout the development stage and leveraging the benefits of improved threat modeling at each point in an IDS to improve the IoT system's security.

Such threat modeling as disclosed herein can go much farther in securing many devices in an intelligent home setup. Realistically, ordinary individuals will have a variety of IoT devices in their house, many of which will have fundamental functions that the individuals will not be aware of. Homeowners are thus placed in an insecure setting as the IoT devices are susceptible to cyber threats. The concepts described herein can be applied to map out the security posture of a whole system of IoT devices. In the case of IoT devices in an intelligent home, additional hardware and software for cloud capabilities can be developed. The disclosed threat models can target diverse capabilities depending on a system's complexity while bringing to light new risks that may have previously gone unnoticed.

Exemplary Computer System

Figure 7:
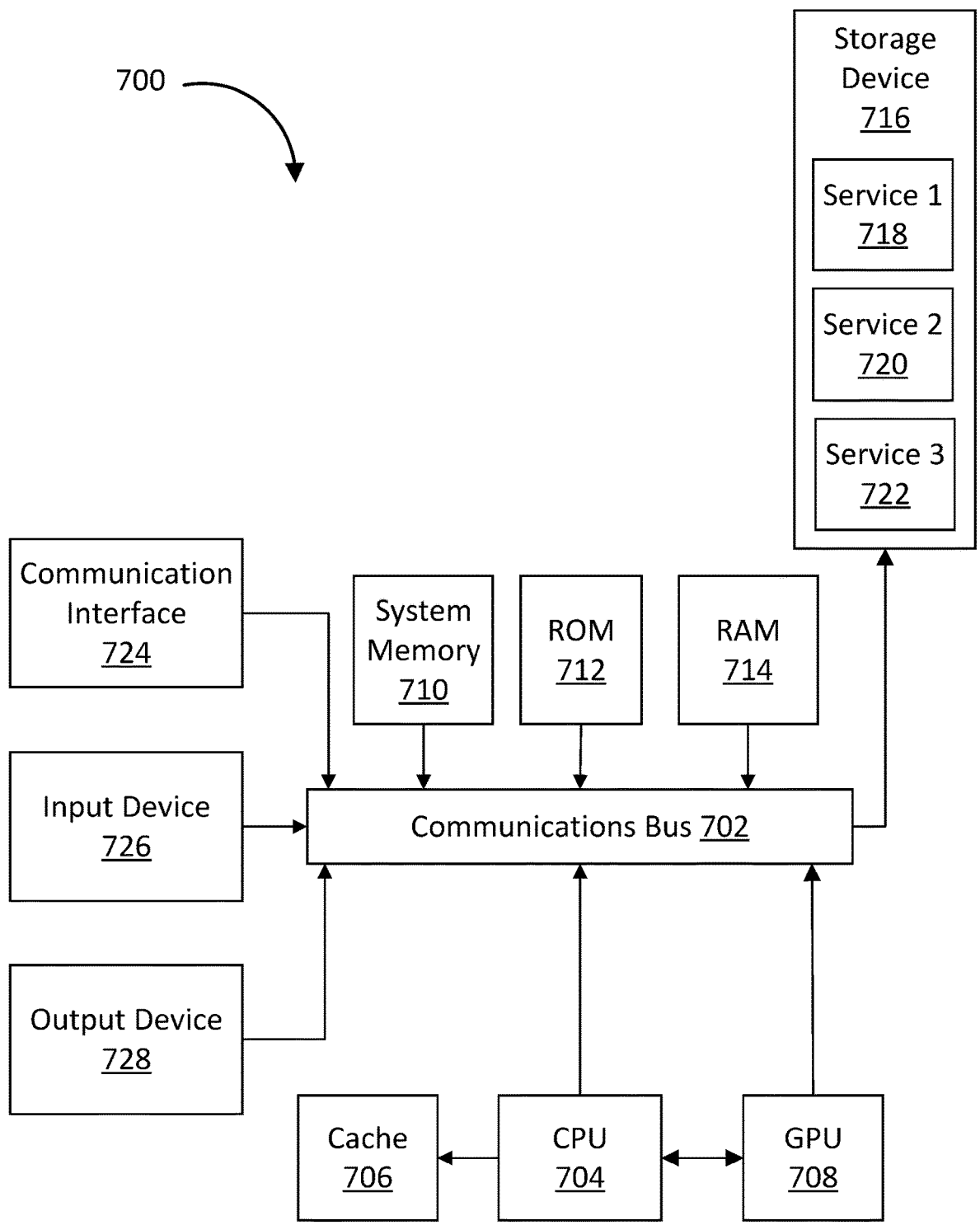
FIG. 7 illustrates an exemplary computer system suitable for implementing the methods and systems described herein.

FIG. 7 illustrates an exemplary computer system 700 suitable for implementing the methods and systems described herein. The Intrusion Detection System and aspects implementing the physical security techniques described herein may take the form of computer system 700, although variations thereof may readily be implemented by persons skilled in the art as may be desirable for any particular installation. In each such case, one or more computer systems 700 may carry out the foregoing methods as computer code.

Computer system 700 includes a communications bus 702, or other communications infrastructure, which communicates data to other elements of computer system 700. For example, communications bus 702 may communicate data (e.g., text, graphics, video, other data) between communications bus 702 and an I/O interface to input device 726 and output device 728, which may include a display, a data entry device such as a keyboard, touch screen, mouse, or the like, and any other peripheral devices capable of entering and/or viewing data as may be apparent to those skilled in the art.

Further, computer system 700 includes at least one processor, which may include central processing unit (CPU) 704 and general processing unit (GPU) 708, and which may comprise a special purpose or a general purpose digital signal processor. CPU 704 may communicate with cache 706 for temporary processing memory. CPU 704 can include one or more hardware or software service(s), such as services 718, 720, 722 stored in storage device 716, configured to control the one or more processors of CPU 704. A software service can perform one or more functions when the one or more processors execute(s) the software associated with the service. In some embodiments, a service is a program or a collection of programs that carry out a specific function. In some embodiments, a service can be considered a server. CPU 704 can alternatively, or additionally, include a special-purpose processor having software instructions incorporated into the processor design.

Still further, computer system 700 includes a system memory 710, which may include or interface with random access memory ("RAM") 714, read-only memory ("ROM") 712, one or more mass storage devices, or any combination of tangible, non-transitory memory, for example. Still further, computer system 700 may include a secondary memory, which may comprise a hard disk, a removable data storage unit, or any combination of tangible, non-transitory memory. For example, computer system 700 may include storage device 716.

Finally, computer system 700 may include a communication interface 724, such as a modem, a network interface (e.g., an Ethernet card or cable), a communications port, a PCMCIA slot and card, a wired or wireless communications system (such as Wi-Fi, Bluetooth, Infrared, and the like), local area networks, wide area networks, intranets, and the like.

Each of system memory 710, ROM 712, RAM 714, storage device 716, communication interface 724, and combinations of the foregoing may function as a non-transitory computer usable storage medium or computer readable storage medium to store and/or access computer software including computer instructions. For example, computer programs or other instructions may be loaded into the computer system 700 such as through a removable data storage device (e.g., a floppy disk, ZIP disks, magnetic tape, portable flash drive, optical disk such as a CD, DVD, or Blu-ray disk, Micro Electro Mechanical Systems ("MEMS"), and the like). Thus, computer software including computer instructions may be transferred from, e.g., a removable storage or hard disc to secondary memory, or through communications bus 702 to system memory 710.

Communication interface 724 allows software, instructions and data to be transferred between the computer system 700 and external devices or external networks. Software, instructions, and/or data transferred by the communication interface 724 are typically in the form of signals that may be electronic, electromagnetic, optical or other signals capable of being sent and received by communication interface 724. Signals may be sent and received using a cable or wire, fiber optics, telephone line, cellular telephone connection, radio frequency ("RF") communication, wireless communication, or other communication channels as will occur to those of ordinary skill in the art.

Computer programs, when executed, allow one or more processors of computer system 700 to implement the methods discussed herein for the detection and prevention of various cyber-attacks on BACnet devices in communication on a BACnet MS/TP network, according to computer software including instructions. Computer system 700 may perform any one of, or any combination of, the steps of any of the methods described herein. It is also contemplated that the methods according to the present invention may be performed automatically or may be accomplished by some form of manual intervention.

The computer system 700 is provided only for purposes of illustration, such that the invention is not limited to this specific embodiment. Persons having ordinary skill in the art are capable of programming and implementing the instant invention using any computer system.

Further, computer system 700 may, in certain implementations, comprise a handheld device and may include any small-sized computing device, including by way of non-limiting example a cellular telephone, a smartphone or other smart handheld computing device, a personal digital assistant, a laptop or notebook computer, a tablet computer, a hand held console, an MP3 player, or other similarly configured small-size, portable computing device as may occur to those skilled in the art.

An Intrusion Detection System may, in an exemplary configuration, be implemented in a cloud computing environment for carrying out the methods described herein. That cloud computing environment uses the resources from various networks as a collective virtual computer, where the services and applications can run independently from a particular computer or server configuration making hardware less important. The cloud computer environment includes at least one user computing device. The client computer may be any device that may be used to access a distributed computing environment to perform the methods disclosed herein and may include (by way of non-limiting example) a desktop computer, a portable computer, a mobile phone, a personal digital assistant, a tablet computer, or any similarly configured computing device.

A client computer preferably includes memory such as RAM, ROM, one or more mass storage devices, or any combination of the foregoing. The memory functions as a computer readable storage medium to store and/or access computer software and/or instructions.

A client computer also preferably includes a communications interface, such as a modem, a network interface (e.g., an Ethernet card), a communications port, a PCMCIA slot and card, wired or wireless systems, and the like. The communications interface allows communication through transferred signals between the client computer and external devices including networks such as the Internet and a cloud data center. Communication may be implemented using wireless or wired capability, including (by way of non-limiting example) cable, fiber optics, telephone line, cellular telephone, radio waves or other communications channels as may occur to those skilled in the art.

Such client computer establishes communication with the one or more servers via, for example, the Internet, to in turn establish communication with one or more cloud data centers that implement an Intrusion Detection System. A cloud data center may include one or more networks that are managed through a cloud management system. Each such network includes resource servers that permit access to a collection of computing resources and components of the Intrusion Detection System, which computing resources and components can be invoked to instantiate a virtual computer, process, or other resource for a limited or defined duration. For example, one group of resource servers can host and serve an operating system or components thereof to deliver and instantiate a virtual computer. Another group of resource servers can accept requests to host computing cycles or processor time, to supply a defined level of processing power for a virtual computer. Another group of resource servers can host and serve applications to load on an instantiation of a virtual computer, such as an email client, a browser application, a messaging application, or other applications or software.

The cloud management system may comprise a dedicated or centralized server and/or other software, hardware, and network tools to communicate with one or more networks, such as the Internet or other public or private network, and their associated sets of resource servers. The cloud management system may be configured to query and identify the computing resources and components managed by the set of resource servers needed and available for use in the cloud data center. More particularly, the cloud management system may be configured to identify the hardware resources and components such as type and amount of processing power, type and amount of memory, type and amount of storage, type and amount of network bandwidth and the like, of the set of resource servers needed and available for use in the cloud data center. The cloud management system can also be configured to identify the software resources and components, such as type of operating system, application programs, etc., of the set of resource servers needed and available for use in the cloud data center.

In accordance with still further aspects of an embodiment of the invention, a computer program product may be provided to provide software to the cloud computing environment. Computer products store software on any computer useable medium, known now or in the future. Such software, when executed, may implement the methods according to certain embodiments of the invention. By way of non-limiting example, such computer usable mediums may include primary storage devices (e.g., any type of random access memory), secondary storage devices (e.g., hard drives, floppy disks, CD ROMS, ZIP disks, tapes, magnetic storage devices, optical storage devices, MEMS, nanotech storage devices, etc.), and communication mediums (e.g., wired and wireless communications networks, local area networks, wide area networks, intranets, etc.). Those skilled in the art will recognize that the embodiments described herein may be implemented using software, hardware, firmware, or combinations thereof.

The cloud computing environment described above is provided only for purposes of illustration and does not limit the invention to this specific embodiment. It will be appreciated that those skilled in the art are readily able to program and implement the invention using any computer system or network architecture.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

The invention claimed is:

1. A computer-automated method of modeling intrusion detection on an Internet of Things (IoT) network, the method comprising:
   preprocessing a set of raw data packets received from one or more entities on the IoT network, wherein the preprocessing comprises:

receiving the set of raw data packets from the one or more entities on the IoT network;
converting the raw data packets to a packet capture (PCAP) file;
converting the PCAP file to a comma separated value (CSV) file;
filtering the CSV file to create a normal CSV file and an abnormal CSV file;
merging the normal CSV file and the abnormal CSV file to create a merged file;
removing redundant data in the merged file;
adding the merged file to a concatenated file with other merged files; and
extracting features from the concatenated file to create a set of extracted features;
building a test machine language (ML) model using the set of extracted features;
determining at least one ML classifier of a set of ML classifiers based on the test ML model;
building an ensemble ML model from the set of ML classifiers to determine one or more attack types;
identifying an attack in the abnormal CSV file and labeling the features as being associated with the attack; and
classifying the attack as an attack type based on the features.

2. The computer-automated method of claim 1, further comprising running additional raw data packets from the IoT network through the ensemble ML model to detect another attack of the attack type.

3. The computer-automated method of claim 1, wherein the filtering comprises extracting and deleting packet headers of the CSV file before creating the normal CSV file and the abnormal CSV file.

4. The computer-automated method of claim 1, further comprising selecting a first ML classifier to include in the set of ML classifiers that detects a first attack during training of the test ML model.

5. The computer-automated method of claim 1, wherein the set of ML classifiers comprise one or more of Logistic Regression, Decision Tree, Random Forest, AdaBoost, Gradient Boosting, eXtreme Gradient Boosting (XGB), XGB Random Forest (XGBRF), K-neighbor, Light Gradient Boosting Machine (LGBM), and Support Vector Machine (SVM) classifiers.

6. The computer-automated method of claim 1, further comprising splitting the set of extracted features into test data and training data.

7. The computer-automated method of claim 6, wherein the test data comprises 20% of the set of extracted features and the training data comprises 80% of the set of extracted features.

8. The computer-automated method of claim 7, wherein the set of ML classifiers is determined from the training data.

9. The computer-automated method of claim 1, wherein each ML classifier of the set of ML classifiers is determined from unique features in the test ML model.

10. The computer-automated method of claim 1, wherein each one of the other merged files is created by preprocessing a corresponding other set of raw data packets from the one or more entities on the IoT network.

11. The computer-automated method of claim 10, wherein the ensemble ML model is further built from additional extracted features resulting from the preprocessing of the corresponding other set of raw data packets.

12. The computer-automated method of claim 11, wherein the further built ensemble ML model comprises ensemble ML classifiers to detect attacks of multiple different attack types.

13. The computer-automated method of claim 6, wherein the test ML model is built from the test data.

14. The computer-automated method of claim 2, further comprising evaluating metrics associated with the detection of the other attack and updating at least one ML classifier of the set of ML classifiers based on the metrics.

15. The computer-automated method of claim 12, further comprising evaluating aggregated metrics associated with the detection of the attacks of multiple different attack types and updating the set of ML classifiers based on the aggregated metrics.

16. A system for modeling intrusion detection on an Internet of Things (IoT) network, the system comprising:
a device comprising one or more processors and memory storing computer-executable instructions that, when executed by the one or more processors, cause the device to:
preprocess a set of raw data packets received from one or more entities on the IoT network, wherein the preprocessing comprises:
receive the set of raw data packets from the one or more entities on the IoT network;
convert the raw data packets to a packet capture (PCAP) file;
convert the PCAP file to a comma separated value (CSV) file;
filter the CSV file to create a normal CSV file and an abnormal CSV file;
merge the normal CSV file and the abnormal CSV file to create a merged file;
remove redundant data in the merged file;
add the merged file to a concatenated file with other merged files; and
extract features from the concatenated file to create a set of extracted features;
build a test machine language (ML) model using the set of extracted features;
determine at least one ML classifier of a set of ML classifiers based on the test ML model;
build an ensemble ML model from the set of ML classifiers to determine one or more attack types;
identify an attack in the abnormal CSV file and label the features as being associated with the attack; and
classify the attack as an attack type based on the features.

* * * * *